(12) United States Patent
Lin

(10) Patent No.: US 7,073,377 B2
(45) Date of Patent: Jul. 11, 2006

(54) TIRE PARAMETER SENSING SYSTEM WITH SIGNAL RELAY DEVICE AND ASSOCIATED METHOD

(75) Inventor: Xing Ping Lin, Orchard Lake, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 76 days.

(21) Appl. No.: 10/733,604

(22) Filed: Dec. 11, 2003

(65) Prior Publication Data

US 2005/0126275 A1 Jun. 16, 2005

(51) Int. Cl.
*G01M 17/02* (2006.01)
(52) U.S. Cl. ..................................... 73/146.8
(58) Field of Classification Search .................. 73/146, 73/146.2, 146.3, 146.4, 146.5, 146.8, 732; 701/29
See application file for complete search history.

(56) References Cited

U.S. PATENT DOCUMENTS

| | | | |
|---|---|---|---|
| 4,723,445 A * | 2/1988 | Ripley et al. ............... | 73/146.3 |
| 4,978,941 A | 12/1990 | Brown | |
| 5,602,524 A | 2/1997 | Mock et al. | |
| 5,741,966 A | 4/1998 | Handfield et al. | |
| 6,304,172 B1 | 10/2001 | Katou et al. | |
| 6,469,621 B1 | 10/2002 | Vredevoogd et al. | |
| 6,591,671 B1 * | 7/2003 | Brown ....................... | 73/146.5 |
| 2001/0008083 A1 * | 7/2001 | Brown ........................ | 73/146 |
| 2002/0060640 A1 * | 5/2002 | Davis et al. ................ | 342/104 |
| 2003/0164032 A1 * | 9/2003 | Nantz et al. .................. | 73/146 |
| 2004/0193340 A1 * | 9/2004 | Katou .......................... | 701/29 |
| 2004/0193341 A1 * | 9/2004 | Katou .......................... | 701/29 |

* cited by examiner

*Primary Examiner*—Edward Lefkowitz
*Assistant Examiner*—Andre Allen
(74) *Attorney, Agent, or Firm*—Tarolli, Sundheim, Covell & Tummino LLP

(57) ABSTRACT

A tire parameter sensing system (12) comprises a tire-based unit (28) associated with a tire (20) of a vehicle (10) for sensing a parameter of the tire (20) and for transmitting a tire parameter signal (42) indicative of the sensed parameter. A transceiver device (34) receives the tire parameter signal (42) and transmits a relay signal (42') indicative of the received tire parameter signal (42). A vehicle-based unit (32) is adapted to receive both the tire parameter signal (42) and the relay signal (42'). An indicator (54) is coupled to the vehicle-based unit (32) for providing an indication of the sensed parameter of the tire (20). The vehicle-based unit (32) controls the indicator (54) in response to receiving at least one of the tire parameter signal (42) and the relay signal (42').

17 Claims, 3 Drawing Sheets

TIRE PARAMETER SENSING SYSTEM WITH SIGNAL RELAY DEVICE AND ASSOCIATED METHOD

TECHNICAL FIELD

The present invention relates to a tire parameter sensing system for a vehicle and an associated method. More particularly, the present invention relates to a tire parameter sensing system having a signal relay device for relaying signals between tire-based units and a vehicle-based unit and an associated method.

BACKGROUND OF THE INVENTION

A typical tire parameter sensing system for a vehicle includes a vehicle-based unit and a plurality of tire-based units. Each vehicle tire has an associated tire-based unit. Each tire-based unit includes at least one parameter sensor (e.g., pressure, temperature, etc.), a controller, and transmission circuitry for transmitting a tire parameter signal indicative of the sensed tire parameter(s). Typically, a tire-based unit transmits the tire parameter signal multiple times. For example, the tire-based unit may transmit each tire parameter signal twice, with a predetermined time delay, e.g., 4 milliseconds, between transmissions. The tire parameter signal is transmitted via wireless communication to the vehicle-based unit. The vehicle-based unit includes a receiver for receiving the transmitted tire parameter signals and a display for providing information to the vehicle operator regarding the sensed tire parameter(s).

Various obstacles may be encountered when transmitting tire parameter signals via wireless communication between a tire-based unit and the vehicle-based unit. One obstacle that may be encountered is signal cancellation of the tire parameter signals. At least a portion of the transmitted signal is lost or cancelled during signal cancellation. Signal cancellation may occur as a result of multiple tire-based units transmitting at the same time or as a result of other signal transmissions in the atmosphere. Rotational effects of the vehicle tires may also contribute to signal cancellation.

Another obstacle to wireless communication between a tire-based unit and the vehicle-based unit is interference from electrical noise sources. Many electronic devices associated with the vehicle produce electrical noise. Furthermore, the atmosphere surrounding the vehicle includes electrical noise. The noise may interfere with the reception of the tire parameter signals at the receiver of the vehicle-based unit. When a signal that is received by the receiver of the vehicle-based unit has a signal-to-noise ratio that is less than a predefined value, the receiver of the vehicle-based unit ignores the signal. Thus, it is desirable for a tire parameter sensing system to include structure for helping to overcome these obstacles to wireless communication between a tire-based unit and the vehicle-based unit.

SUMMARY OF THE INVENTION

The present invention relates to a tire parameter sensing system for a vehicle having at least one tire. The tire parameter sensing system comprises a tire-based unit associated with the at least one tire for sensing a parameter of the at least one tire and for transmitting a tire parameter signal indicative of the sensed parameter. The tire parameter sensing system also comprises a transceiver device that is located on the vehicle for receiving the tire parameter signal and for transmitting a relay signal indicative of the received tire parameter signal. The tire parameter sensing system still further includes a vehicle-based unit that is mounted on the vehicle in a location spaced away from the transceiver device. The vehicle-based unit is adapted to receive both the tire parameter signal and the relay signal. An indicator is coupled to the vehicle-based unit for providing an indication of the sensed parameter of the at least one tire. The vehicle-based unit controls the indicator in response to receiving at least one of the tire parameter signal and the relay signal.

According to another aspect, the present invention relates to a method of monitoring a parameter of at least one tire of a vehicle. The method comprising the steps of: sensing the parameter of the at least one tire; transmitting a tire parameter signal indicative of the sensed parameter; receiving the tire parameter signal at a first location; transmitting a relay signal from the first location. The relay signal is indicative of the received tire parameter signal. The method further comprises the steps of: monitoring at a second location for both the tire parameter signal and the relay signal; and displaying an indication of the sensed parameter in response to receiving at least one of the tire parameter signal and the relay signal at the second location.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
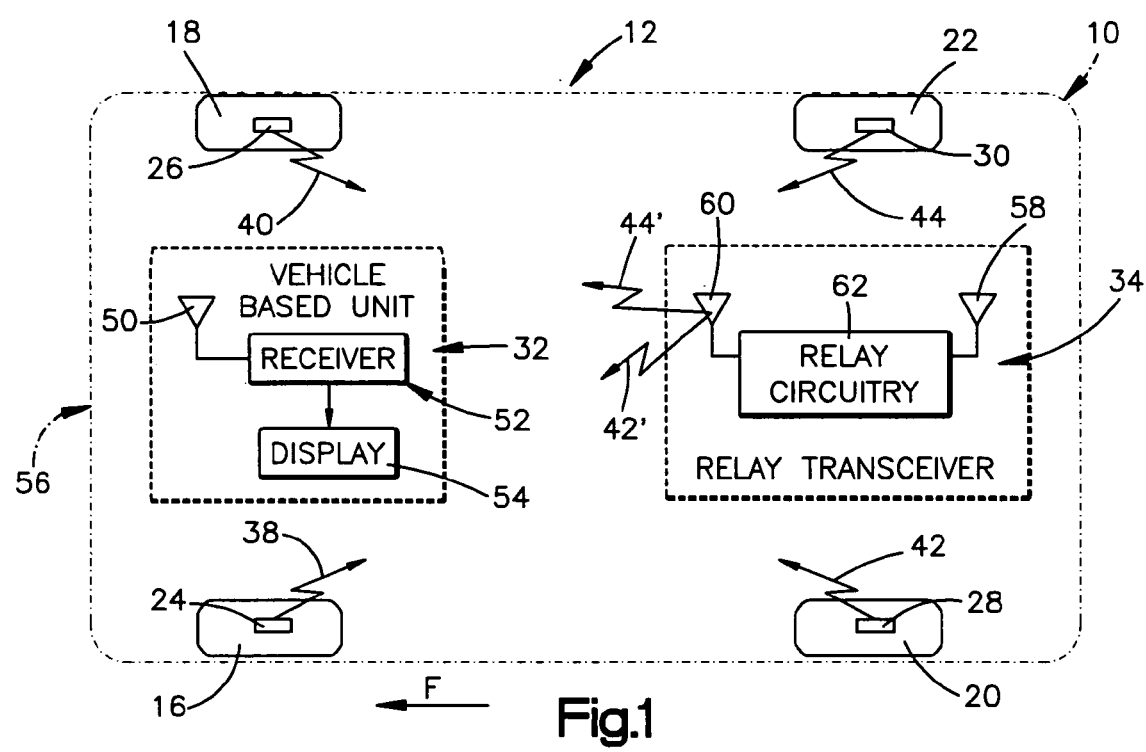
FIG. 1 schematically illustrates a vehicle including a tire parameter sensing system constructed in accordance with an exemplary embodiment of the present invention.

FIG. 1 schematically illustrates a vehicle 10 including a tire parameter sensing system 12 constructed in accordance with an exemplary embodiment of the present invention. For illustrative purposes, the vehicle 10 of FIG. 1 is an automobile having four tires 16, 18, 20, and 22. Vehicles having a number of tires other than four are also contemplated by the present invention.

The tire parameter sensing system 12 includes four tire-based units 24, 26, 28, and 30, a vehicle-based unit 32, and a relay transceiver 34. Each tire 16, 18, 20, and 22 of the vehicle 10 includes an associated tire-based unit 24, 26, 28, and 30, respectively, for sensing at least one parameter, e.g., pressure, temperature, etc., of the tire and for providing a tire parameter signal 38, 40, 42, and 44, respectively, to the vehicle-based unit 32. The tire parameter signals 38, 40, 42, and 44 are indicative of the sensed parameter(s) of the respective tires 16, 18, 20, and 22. Preferably, the tire parameter signals 38, 40, 42, and 44 are radio frequency ("RF") signals.

The vehicle-based unit 32 includes an antenna 50 that is connected to a receiver 52. The vehicle-based unit 32 also includes an indicator or display 54 that is operatively coupled to the receiver 52. The display 54 is located within the vehicle occupant compartment and indicates the tire parameters to the vehicle operator. The vehicle-based unit 32 is mounted to the vehicle in a location near the front 56 of the vehicle 10. The arrow labeled F in FIG. 1 indicates a forward travel direction of the vehicle 10. In the exemplary embodiment illustrated in FIG. 1, the vehicle-based unit 32 is located between the front tires 16 and 18 of the vehicle 10.

The relay transceiver 34 includes a receiving antenna 58, a transmitting antenna 60, and relay circuitry 62. The relay circuitry 62 is described in detail below. The relay transceiver 34 is operative to receive tire parameter signals, such as tire parameter signals 42 and 44, and to transmit relay signals, such as relay signals 42' and 44', that are indicative of the received tire parameter signals 42 and 44, respectively. The relay transceiver 34 is located on the vehicle 10 in a location spaced away from the vehicle-based unit 32. In the exemplary embodiment illustrated in FIG. 1, the relay transceiver 34 is located between the rear tires 20 and 22 of the vehicle 10.

Figure 2:
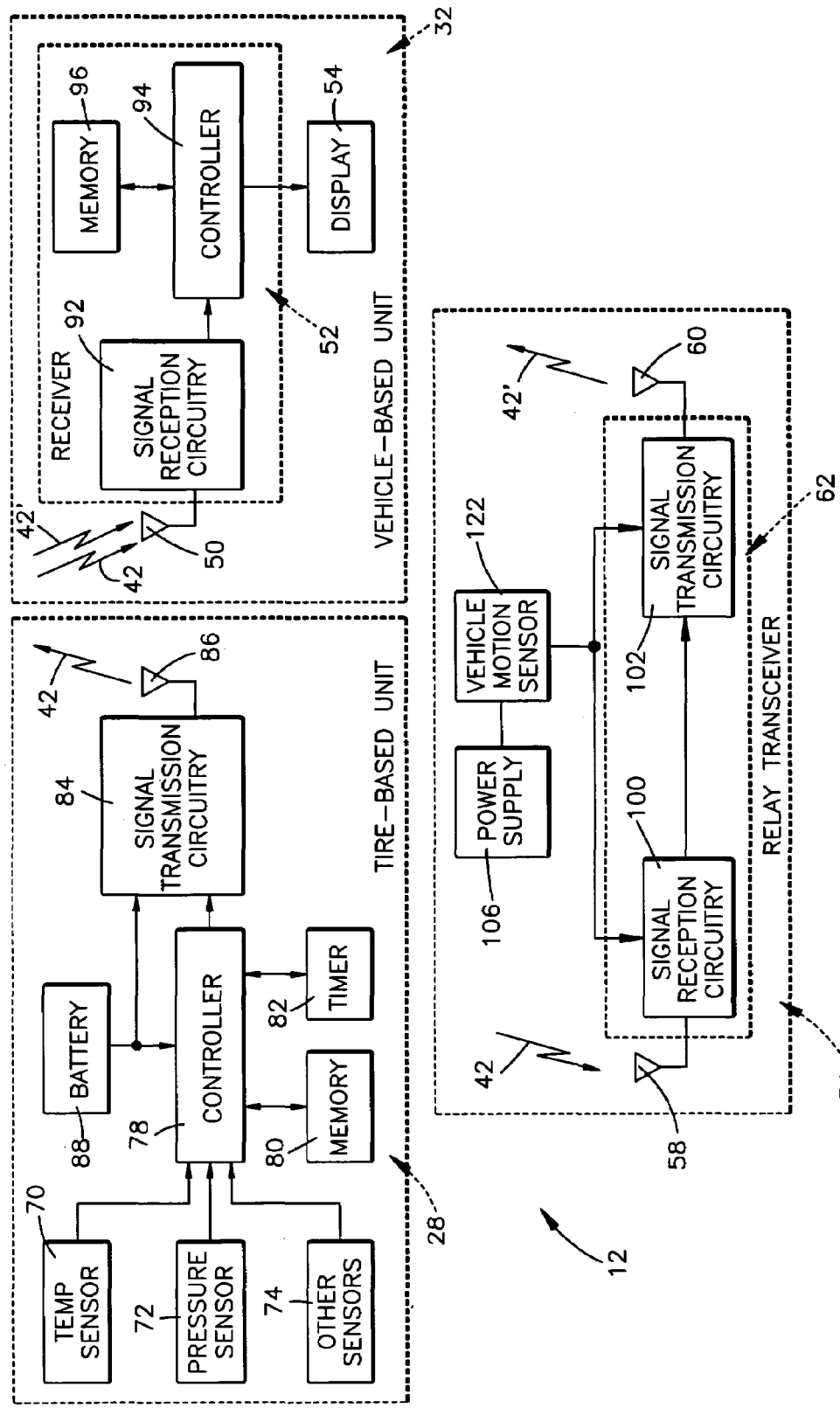
FIG. 2 is a schematic block diagram of the tire parameter sensing system of FIG. 1.

FIG. 2 is a schematic block diagram of the tire parameter sensing system 12 of FIG. 1. For purposes of example, FIG. 2 only illustrates tire-based unit 28. Tire-based units 24, 26, and 30 may have structures similar to tire-based unit 28. The tire-based unit 28 includes a temperature sensor 70, a pressure sensor 72, and other sensors 74. The temperature sensor 70 is operable for sensing temperature within the associated tire 20 and providing temperature signals. The pressure sensor 72 is operable for sensing pressure within the associated tire 20 and for providing pressure signals. The other sensors 74 are operable for sensing other parameters of either the associated tire 20 or the tire-based unit 28 and for providing other parameter signals indicative of the other sensed parameters. For example, the other sensors 74 may include a voltage sensor for determining a supply voltage within the tire-based unit 28.

The tire-based unit 28 also includes a controller 78. The controller 78 is preferably a microcomputer. Alternatively, the controller 78 may be formed from discrete circuitry, an application-specific-integrated-circuit ("ASIC"), or any other type of control circuitry. The controller 78 is operatively coupled to the temperature sensor 70, the pressure sensor 72, and the other sensors 74 and receives the temperature signals, the pressure signals, and the other parameter signals. The controller 78 performs a tire parameter sensing algorithm and outputs a message packet that includes information indicative of one or more of the sensed temperature, pressure, and other parameters. Any known tire parameter sensing algorithm may be used with the present invention.

The tire-based unit 28 also includes a memory 80 and a timer 82 that are operatively coupled to the controller 78. Alternatively, the memory 80 and the timer 82 may form portions of the controller 78. The tire parameter sensing algorithm is stored in the memory 80. The memory 80 also stores an identification code for identifying the tire-based unit 28. Each tire-based unit 24, 26, 28, and 30 has a unique associated identification code. The controller 78 includes the identification code in the output message packet.

The timer 82 provides the controller 78 with timing signals. The controller 78 uses the timing signals, in accordance with the tire parameter sensing algorithm, for monitoring the temperature sensor 70, pressure sensor 72, and other sensors 74 and for outputting the message packet. For example, the controller 78 may monitor the temperature sensor 70, pressure sensor 72, and other sensor 74 at intervals of four seconds and may output a message packet at intervals of one minute.

The tire-based unit 28 also includes signal transmission circuitry 84. The signal transmission circuitry 84 includes components, such as a radio frequency ("RF") amplifier (not shown) and other known components, for transmitting tire parameter signal 42 via a transmitting antenna 86. The signal transmission circuitry 84 receives message packets from the controller 78 and transmits the message packets in the tire parameter signals 42. The message packets are modulated onto a constant frequency carrier signal using known modulation techniques, such as amplitude shift keying ("ASK"). Each tire parameter signal 42 includes both a carrier signal and the modulated message packet. The tire parameter signal 42 is transmitted at a first predetermined frequency, i.e., the carrier signal has a first predetermined frequency, for example, of 315 MHz.

A battery 88 of the tire-based unit 28 provides electrical power to the controller 78 and the signal transmission circuitry 84. The battery 88 is preferably a long life lithium battery.

The receiver 52 of the vehicle-based unit 32 includes signal reception circuitry 92 and a controller 94. The signal reception circuitry 92 is operatively coupled to the antenna 50. The signal reception circuitry 92 is adapted to receive signals at two predetermined frequencies. The first predetermined frequency is the frequency at which tire parameter signal 42 is transmitted. A second predetermined frequency is different from the first predetermined frequency. Preferably, both the first and the second predetermined frequencies are in the radio frequency range. Signals received by the signal reception circuitry 92 of the receiver 52 are conditioned using signal conditioning circuitry (not shown), such as filters, of the signal reception circuitry 92. The signal reception circuitry 92 also includes demodulating circuitry (not shown) for demodulating the received signals and for outputting message packets received in the received signals to the controller 94.

The controller 94 of the vehicle-based unit 32 is preferably a microcomputer. Alternatively, the controller 94 may be formed from discrete circuitry, an application-specific-integrated-circuit ("ASIC"), or any other type of control circuitry. The controller 94 also performs a tire parameter sensing algorithm. Any known tire parameter sensing algorithm may be used with the present invention.

The controller 94, upon receiving a message packet from the signal reception circuitry 92, determines whether the message packet originated in one of the tire-based units 24, 26, 28, or 30 of the tire parameter sensing system 12. Typically, the controller 94 compares an identification code received in the message packet to identification codes stored in a memory 96 associated with the controller 94 to determine whether the message packet originated in one of the tire-based units 24, 26, 28, or 30. When the controller 94 determines that the received message packet did not originate in one of the tire-based units 24, 26, 28, or 30, the controller 94 ignores the message packet. When the controller 94 determines that the received message packet did originate in one of the tire-based units 24, 26, 28, or 30, the controller 94 analyzes the information received in the message packet, i.e., the information indicating the temperature, the pressure, and/or the other sensed parameters.

The controller 94, after analyzing the information received in the message packet, outputs display signals to the display 54. The display 54, upon receiving the display signals, provides an indication of the information to the vehicle operator. For example, the display 54 may indicate the sensed tire temperature and sensed tire pressure to the vehicle operator.

The relay circuitry 62 of the relay transceiver 34 includes signal reception circuitry 100 and signal transmission circuitry 102. The signal reception circuitry 100 is operatively coupled to the receiving antenna 58. The signal reception circuitry 100 is adapted to receive tire parameter signals at only the first predetermined frequency, e.g., at 315 MHz. The signal reception circuitry 100 conditions the received tire parameter signals, e.g., signal 42, using signal conditioning circuitry (not shown), such as filters, and demodulates the received tire parameter signals using signal demodulating circuitry (not shown). The signal reception circuitry 100 then outputs the message packets of the received tire parameter signals.

The signal transmission circuitry 102 of the relay transceiver 34 is operatively coupled to the signal reception circuitry 100 and receives the message packets output from the signal reception circuitry. The signal transmission circuitry 102 includes circuitry, such as a radio frequency (RF) amplifier (not shown) and other known circuitry, for transmitting relay signals 42' via the transmitting antenna 60. The signal transmission circuitry 102 modulates the message packets onto a constant frequency carrier signal of using known modulation techniques, such as amplitude shift keying. Each relay signal, e.g., signal 42', includes both a carrier signal and the modulated message packet. The relay transceiver 34 transmits the relay signals 42' and 44' (FIG. 1) at the second predetermined frequency, i.e., the carrier signal has the second predetermined frequency, for example, of 335 MHz.

Figure 3:
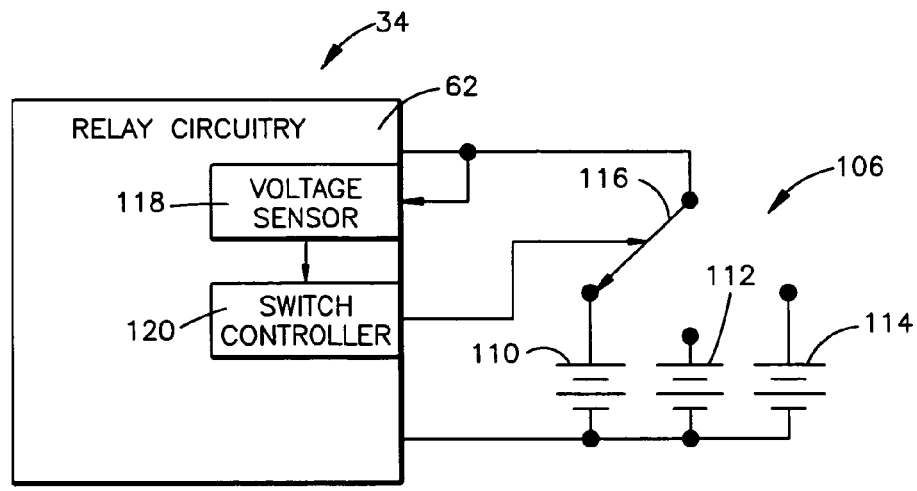
FIG. 3 schematically illustrates an exemplary power supply for a relay transceiver of the tire parameter sensing system of FIG. 2.
Figure 4:
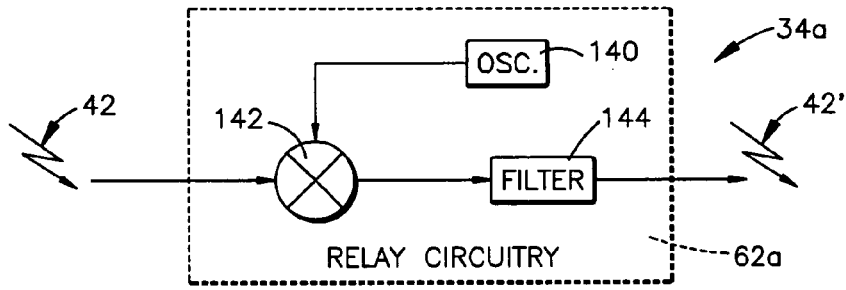
FIG. 4 illustrates the relay circuitry of a relay transceiver constructed in accordance with a second exemplary embodiment of the present invention.

The relay transceiver 34 also includes a power supply 106 for supplying electrical energy to the signal reception circuitry 100 and the signal transmission circuitry 102. FIG. 3 schematically illustrates an exemplary power supply 106 for the relay circuitry 62 of the relay transceiver 34. The power supply 106 of FIG. 3 includes three batteries 110, 112, and 114 wired in parallel with one another. A switch 116 is operative to connect one of the batteries 110, 112, or 114 to the relay circuitry 62 at a time. The relay circuitry 62 includes a voltage sensor 118 and a switch controller 120. The voltage sensor 118 senses the voltage supplied to the relay circuitry 62 from the battery, e.g., 110, that is connected to the relay circuitry by the switch 116. The voltage sensor 118 outputs signals indicative of the sensed voltage to the switch controller 120. The switch controller 120 is controllably coupled to the switch 116 and controls the location of switch. When the switch controller 120 determines that the voltage being supplied by a particular battery, e.g., 110, is below a predetermined value, the switch controller 120 causes the switch 116 to disconnect from the particular battery, e.g., 110, and to connect to another battery, e.g., 112.

The power supply 106 of FIG. 3 is advantageous in that a relay transceiver 34 having the power supply 106 of FIG. 3 is a self-sufficient unit that does not require connection to a vehicle power source, such as the vehicle battery. As a result, the location at which the relay transceiver 34 may be mounted to the vehicle 10 (FIG. 1) is not limited by the proximity of wiring for delivery electrical power from the vehicle power source. Instead, the self-sufficiency of the relay transceiver 34, including the power supply 106 of FIG. 3, enables the relay transceiver 34 to be moved relative to the vehicle 10 into an optimal position for receiving tire parameter signals and for transmitting relay signals to the vehicle-based unit 32. When the optimal position for the relay transceiver 34 is discovered using either empirical or calculated methods, the relay transceiver 34 may be mounted at that location on the vehicle 10. Thus, the location of the relay transceiver 34 on the vehicle 10 may be optimized for each vehicle platform for which the tire parameter sensing system 12 is applied.

The relay transceiver 34 may also include a vehicle motion sensor 122. The vehicle motion sensor 122 of FIG. 2 is operatively connected between the power supply 106 and the relay circuitry 62. The vehicle motion sensor 122 is a switch that opens to disconnect the power supply 106 from the relay circuitry 62 when the vehicle 10 is stationary and closes to connect the power supply 106 to the relay circuitry 62 when the vehicle is in motion. The vehicle motion sensor 122 may be a vibration sensor for sensing vibrations of the vehicle 10 that are indicative of the vehicle running. Alternatively, the vehicle motion sensor 122 may include a switch for indicating when the vehicle ignition (not shown) is on or a switch for indicating that the vehicle transmission (not shown) is located in a drive gear, either forward or reverse.

During operation of the tire parameter sensing system 12, the tire-based units 24, 26, 28, and 30 perform the tire parameter sensing algorithm and transmit tire parameter signals 38, 40, 42, and 44, respectively. Due to the relative proximity of the vehicle-based unit 32 to the front tires 16 and 18 of the vehicle 10, the vehicle-based unit 32 typically receives the tire parameter signals 38 and 40 transmitted by tire-based sensors 24 and 26, respectively. Signal cancellation or noise may prevent the vehicle-based unit from receiving the tire parameter signals 42 and 44 transmitted by tire-based units 28 and 30, respectively. Due to the relative proximity of the relay transceiver 34 to the rear tires 20 and 22 of the vehicle 10, the relay transceiver 34 typically receives the tire parameter signals 42 and 44 transmitted by tire-based units 28 and 30, respectively. The relay transceiver 34, in response to receiving the tire parameter signals, transmits relay signals 42' and 44'. The relay signals 42' and 44' are transmitted at a different frequency (i.e., the second predetermined frequency) than the tire parameter signals 42 and 44 (which are transmitted at the first predetermined frequency). As a result, the vehicle-based unit 32 may receive the relay signals 42' and 44' at times when the transmitted tire parameter signals 42 and 44 are not received. Since the vehicle-based unit 32 is adapted to receive signals at both the first and second predetermined frequencies, the use of the relay transceiver 34 increases the probability that the vehicle-based unit 32 will receive signals indicating the sensed tire parameters of the vehicle tire 16, 18, 20, and 22.

Figure 5:
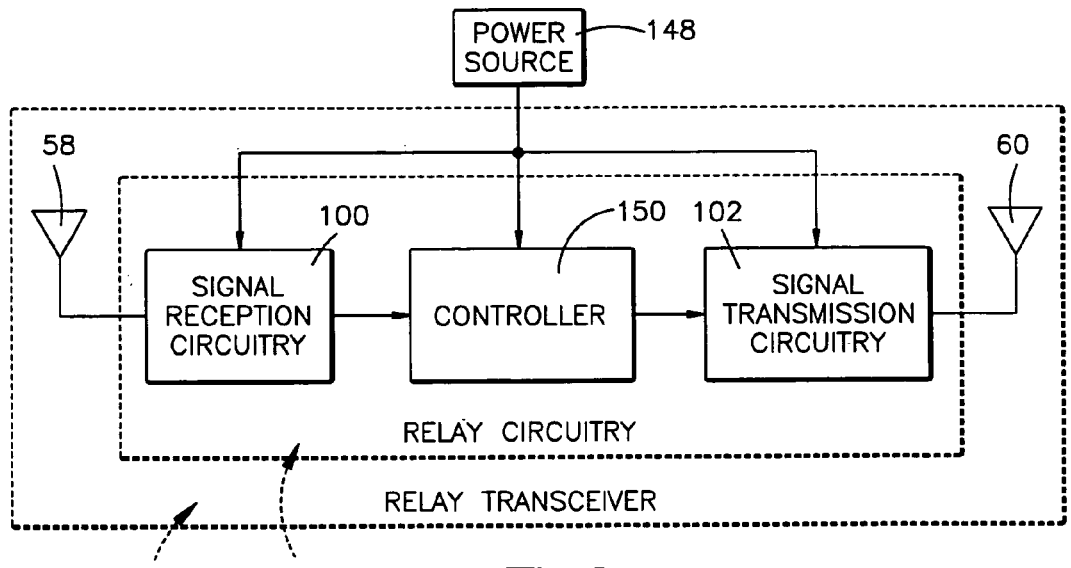
FIG. 5 illustrates a relay transceiver constructed in accordance with a third exemplary embodiment of the present invention.

FIG. 5 illustrates the relay circuitry 62a of a relay transceiver 34a constructed in accordance with a second exemplary embodiment of the present invention. The structure of the relay circuitry 62a of FIG. 5, like the structure of the relay circuitry 62 illustrated and described with regard to FIG. 2, changes the frequency of a received tire parameter signal, e.g., signal 42, from the first predetermined frequency to the second predetermined frequency for transmission of the relay signal, e.g., signal 42'.

The relay circuitry 62a of the relay transceiver 34a of FIG. 5 includes an oscillator 140 that provides a reference frequency signal, e.g., a 20 MHz signal, to a first input of a mixer 142. The received tire parameter signal, e.g., signal 42, having the first predetermined frequency, e.g., 315 MHz, is input into a second input of the mixer 142. The mixer 142 outputs upper and lower side band frequency signals. For example, using the exemplary signal frequencies set forth above, the mixer 142 outputs a lower side band frequency of 295 MHz and an upper side band frequency of 335 MHz.

The output of the mixer 142 is provided to a band pass filter 144 in which one of the lower and upper side band frequencies is removed, e.g., the lower side band frequency is removed. An output of the filter 144 is a signal at the upper side band frequency. The signal is then transmitted as a relay signal, e.g., signal 42', having the second predetermined frequency, e.g., 335 MHz. Optionally, a time delay circuit (not shown) such as an LC circuit may be added to the relay circuitry 62a for providing a fixed time delay between receipt of the tire parameter signal, e.g., signal 42, and transmission of the relay signal, e.g., signal 42'.

FIG. 6 illustrates a relay transceiver 34b constructed in accordance with a third exemplary embodiment of the present invention. Structure of the FIG. 6 that are the same or similar to structures of the relay transceiver 34 of FIG. 2 are illustrated using the same reference numbers and are not described in detail with regard to FIG. 6.

The relay transceiver 34b of FIG. 6 is connected to an external power source 148. The external power source 148 is preferably the battery of the vehicle 10 (FIG. 1). Alternatively, the relay transceiver 34b may use a power supply similar to the power supply 106 of FIG. 3. When the relay transceiver 34b uses a power supply similar to the power supply 106 of FIG. 3, a vehicle motion sensor 122 may also be used.

The relay circuitry 62b of the relay transceiver 34b of FIG. 6 includes signal reception circuitry 100, a controller 150, and signal transmission circuitry 102. The controller 150 is preferably a microcomputer. Alternatively, the controller 150 may be formed from discrete circuitry, an application-specific-integrated-circuit ("ASIC"), or any other type of control circuitry.

The signal reception circuitry 100 outputs the message packets of received tire parameter signals to the controller 150. The controller 150 performs an algorithm for determining a random time delay. Any known algorithm for determining a random time delay may be used with the present invention. The controller 150 also includes an internal timer (not shown) for tracking elapsed time. The controller 150 holds a received message packet for the determined random time delay. After the determined random time delay has elapsed, the controller 150 outputs the received message packet to the signal transmission circuitry 102. The signal transmission circuitry 102 transmits the message packet in a relay signal, e.g., signal 42'. The signal transmission circuitry 102 of the relay transceiver 34b may transmit the relay signals, e.g., signal 42', at the same frequency as the received tire parameter signals, e.g., signal 42. Alternatively, in a manner similar to that described with reference to FIG. 2, the signal transmission circuitry 102 of the relay transceiver 34b may transmit the relay signals, e.g., signal 42', at a different frequency, i.e., at the second predetermined frequency, than the received tire parameter signals, e.g., signal 42.

The random time delay provided by the relay circuitry 62b of FIG. 6 enables interference from noise emitted from sources external to the vehicle 10 (FIG. 1) to dissipate. As a result, the noise level at transmission of the relay signal, e.g., signal 42', may be sufficiently different than the noise level at the transmission of the tire parameter signal, e.g., signal 42, so that the vehicle-based unit 32 receives one of the signals, either the tire parameter signal 42 or the relay signal 42'. Thus, the use of the relay transceiver 34b having the random time delay increases the probability that the vehicle-based unit 32 will receive signals indicating the sensed tire parameters of the vehicle tires 20 and 22.

From the above description of the invention, those skilled in the art may perceive improvements, changes, and modifications. For example, the controller 150 of the relay circuitry 62b of the relay transceiver 34b of FIG. 6 may modify the message packets transmitted in the relay signals, e.g., signal 42', so as to add a flag indicating that the message packet was sent by the relay transceiver 34b. This flag will enable the vehicle-based unit 32 to distinguish between tire parameter signals and relay signals when the tire parameter signals and the relay signals are transmitted at the same frequency, i.e., both at the first predetermined frequency. Such improvements, changes and modifications within the skill of the art are intended to be covered by the appended claims.

Having described the invention, I claim the following:

1. A tire parameter sensing system for a vehicle having at least one tire, the tire parameter sensing system comprising:
   a tire-based unit associated with the at least one tire for sensing a parameter of the at least one tire and for transmitting a tire parameter signal indicative of the sensed parameter;
   a transceiver device located on the vehicle for receiving the tire parameter signal and for transmitting a relay signal indicative of the received tire parameter signal;
   a vehicle-based unit mounted on the vehicle in a location spaced away from the transceiver device, the vehicle-based unit adapted to receive both the tire parameter signal and the relay signal; and
   an indicator coupled to the vehicle-based unit for providing an indication of the sensed parameter of the at least one tire,
   the vehicle-based unit controlling the indicator in response to receiving at least one of the tire parameter signal and the relay signal.

2. The tire parameter sensing system of claim 1 wherein the tire-based unit transmits the tire parameter signal at a first predetermined frequency and wherein the transceiver device transmits the relay signal at a second, different predetermined frequency.

3. The tire parameter sensing system of claim 2 wherein the transceiver device includes first circuitry for demodulating the received tire parameter signal having the first predetermined frequency and outputting a message packet having information indicating the sensed parameter of the at least one tire, the transceiver device also including second circuitry for receiving the message packet from the first circuitry and for modulating the message packet onto the relay signal having the second predetermined frequency.

4. The tire parameter sensing system of claim 2 wherein the transceiver device includes an oscillator for providing a reference signal and a mixer for mixing the received tire parameter signal having the first predetermined frequency with the reference signal to provide the relay signal having the second predetermined frequency.

5. The tire parameter sensing system of claim 1 wherein the transceiver device includes a power supply for providing electrical energy to the transceiver device.

6. The tire parameter sensing system of claim 5 wherein the power supply includes a plurality of batteries and a switch for connecting one of the batteries to the transceiver device, a control device being responsive to diminished power from the connected battery for disconnecting the connected battery and connecting another one of the plurality of batteries to the transceiver device.

7. The tire parameter sensing system of claim 5 further including a vehicle motion sensor for connecting the power supply to the transceiver device when the vehicle is in motion and for disconnecting the power supply from the transceiver device when the vehicle is stationary.

8. The tire parameter sensing system of claim 1 wherein the vehicle includes at least one front tire that is located near a front of the vehicle and at least one rear tire that is located near the rear of the vehicle, the vehicle-based unit being mounted to the vehicle near the at least one front tire and the transceiver device being mounted to the vehicle near the at least one rear tire.

9. A tire parameter sensing system for a vehicle having at least one tire, the tire parameter sensing system comprising:
   a tire-based unit associated with the at least one tire for sensing a parameter of the at least one tire and for transmitting a tire parameter signal indicative of the sensed parameter;
   a transceiver device located on the vehicle for receiving the tire parameter signal and for transmitting a relay signal indicative of the received tire parameter signal;
   a vehicle-based unit mounted on the vehicle in a location spaced away from the transceiver device, the vehicle-based unit adapted to receive both the tire parameter signal and the relay signal; and
   an indicator coupled to the vehicle-based unit for providing an indication of the sensed parameter of the at least one tire,
   the vehicle-based unit controlling the indicator in response to receiving at least one of the tire parameter signal and the relay signal; and
   wherein a time delay spaces the relay signal in time relative to the tire parameter signal.

10. The tire parameter sensing system of claim 9 wherein the time delay is a random time delay, the transceiver device including structure for providing the random time delay between the tire parameter signal and the relay signal.

11. The tire parameter sensing system of claim 10 wherein the structure of the transceiver device includes first circuitry for demodulating the received tire parameter signal and outputting a message packet having information indicating the sensed parameter of the at least one tire, a controller for determining the random time delay and for outputting the message packet after the random time delay has elapsed, and second circuitry for modulating the message packet onto the relay signal.

12. The tire parameter sensing system of claim 9 wherein the tire-based unit transmits the tire parameter signal at a first predetermined frequency and wherein the transceiver device transmits the relay signal at a second, different predetermined frequency.

13. A method of monitoring a parameter of at least one tire of a vehicle, the method comprising the steps of:
   sensing the parameter of the at least one tire;
   transmitting a tire parameter signal indicative of the sensed parameter;
   receiving the tire parameter signal at a first location;
   transmitting a relay signal from the first location, the relay signal being indicative of the received tire parameter signal;
   monitoring at a second location for both the tire parameter signal and the relay signal; and
   displaying an indication of the sensed parameter in response to receiving at least one of the tire parameter signal and the relay signal at the second location.

14. The method of claim 13 wherein the step of transmitting a tire parameter signal includes the step of transmitting at a first predetermined frequency and wherein the step of transmitting a relay signal from the first location includes transmitting at a second, different predetermined frequency.

15. A method of monitoring a parameter of at least one tire of a vehicle, the method comprising the steps of:
   sensing the parameter of the at least one tire;
   transmitting a tire parameter signal indicative of the sensed parameter;
   receiving the tire parameter signal at a first location;
   transmitting a relay signal from the first location, the relay signal being indicative of the received tire parameter signal;
   monitoring at a second location for both the tire parameter signal and the relay signal;
   displaying an indication of the sensed parameter in response to receiving at least one of the tire parameter signal and the relay signal at the second location; and
   spacing the transmission of the relay signal from the receipt of the tire parameter signal at the first location by a time delay.

16. The method of claim 15 wherein the step of spacing the transmission of the relay signal from the receipt of the tire parameter signal at the first location by a time delay further includes the step of determining a random time delay.

17. The method of claim 15 wherein the step of transmitting a tire parameter signal includes the step of transmitting at a first predetermined frequency and wherein the step of transmitting a relay signal from the first location includes transmitting at a second, different predetermined frequency.

* * * * *